July 22, 1969  H. H. CARY  3,457,412
INFRARED RADIATION DETECTOR EMPLOYING TENSIONED FOIL
TO RECEIVE RADIATION
Filed March 29, 1967  3 Sheets-Sheet 1

INVENTOR.
HENRY H. CARY
By White & Haefliger
ATTORNEYS.

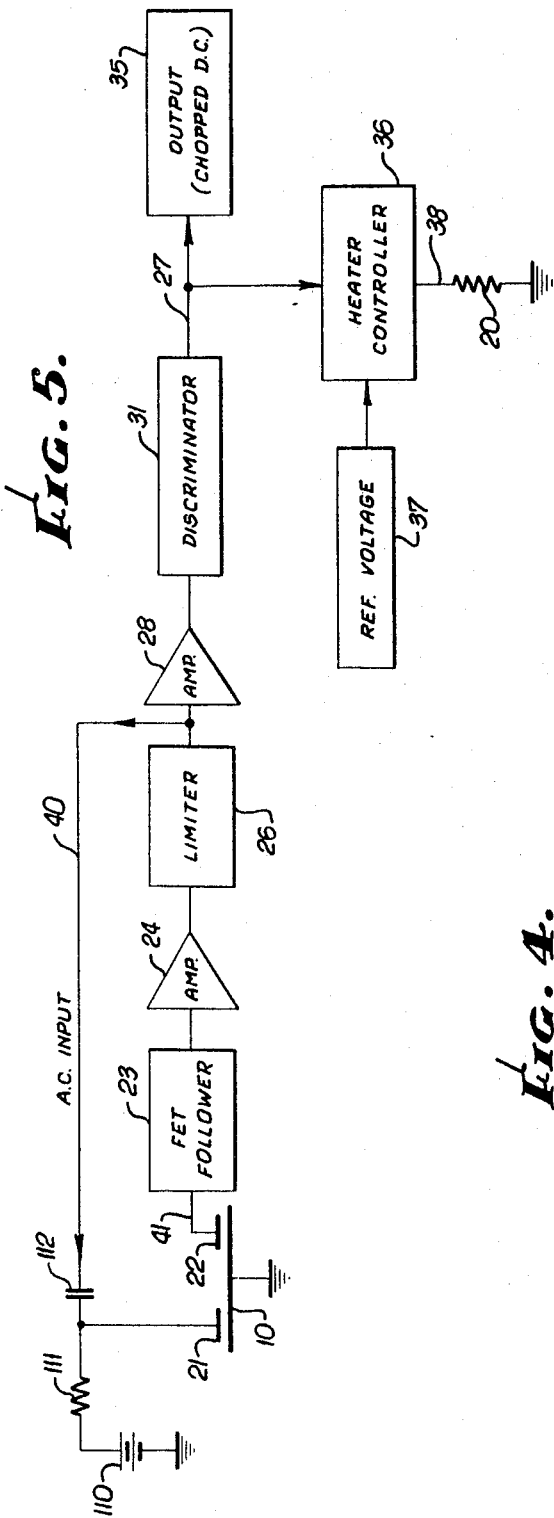
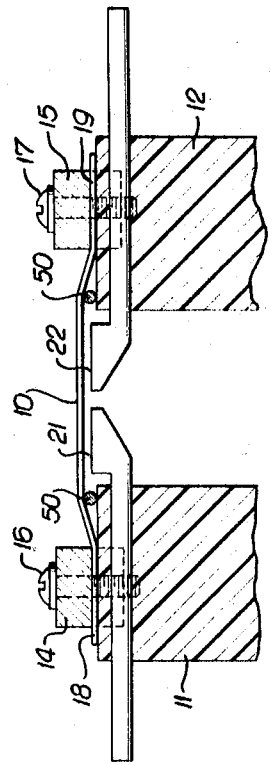
Fig. 5.
Fig. 4.
INVENTOR.
HENRY H. CARY
By White & Haefliger
ATTORNEYS.

INVENTOR.
HENRY H. CARY
By White & Haefliger
ATTORNEYS.

United States Patent Office 3,457,412
Patented July 22, 1969

3,457,412
INFRARED RADIATION DETECTOR EMPLOYING TENSIONED FOIL TO RECEIVE RADIATION
Henry H. Cary, Pasadena, Calif., assignor to Cary Instruments, Monrovia, Calif., a corporation of California
Filed Mar. 29, 1967, Ser. No. 626,872
Int. Cl. G01t 1/16
U.S. Cl. 250—83.3
14 Claims

ABSTRACT OF THE DISCLOSURE

The disclosed radiation measuring device concerns a foil disposed under tension to receive radiation, changes in foil tension arising from radiation incidence on the foil being subject to measurement. Various measuring means are also disclosed.

---

This invention relates generally to apparatus for the measurement of the intensity of electromagnetic radiation and more specifically concerns detectors used for measuring the intensity of infrared radiation as in infrared spectrophotometers and related instruments.

It is the function of detectors of the above type to produce an electrical signal which is representative of the incident radiation. However, it is characteristic of such detectors to produce an output signal which is contaminated with an unwanted random noise. This noise usually contains components extending over a wide band of frequencies, as distinguished from the signal, which normally occupies only a narrow band of frequencies. In consequence, it is usual to employ electrical filters in conjunction with such detectors which have characteristics such that they pass with little attenuation the desired signal and attenuate strongly frequencies outside the signal frequency band. It is also usually to rate the ultimate sensitivity of such detectors by stating the amount of incident radiant power which will produce an output signal having a means square magnitude equal to that of the noise in a one cycle frequency band width. This is termed the noise equivalent power or NEP. The lower the NEP, the better the detector.

All detectors are limitde in their NEP performance by thermal exchange noise which is present because of the statistical arrival and departure of photons at the radiation receiving surface of the detector. Generally speaking, the performance of known thermal detectors is not limited by thermal exchange noise but by noise sources of greater magnitude originating within the detector itself. For example, detectors such as thermocouples or bolometers are limited in their performance by the Johnson or thermal agitation noise arising in the electrical resistances of their elements. The operating principle of such devices as thermocouples and bolometers is a change in an *electrical* property of a radiation-receiving medium when that medium is heated by incident radiation.

The present detector is of that class in which the temperature rise of the radiation receiver causes a change in its *mechanical* properties which in turn is converted to an electrical signal. In this regard, the present detector is distantly related to the Golay detector, Review of Scientific Instruments, vol. 20, pp. 816–820 (1949), in which the heat causes a gas to expand and move a diaphragm, and this motion is detected by means of an optical lever and photocell. Also, related is the detector of R. V. Jones, Proceedings of the Royal Society, vol. 249A, pp. 110–113 (1959), in which the receiver is a blackened metal strip which expands with the temperature rise and causes a mirror mounted on a delicate suspension to turn through an angle and thereby operate an optical level detecting system. A third related detector is that of Dingee, Review of Scientific Instruments, vol. 3, pp. 80–84 (1932), in which the receiver is in the form of a bowed diaphragm which constitutes one plate of a capacitor. A heavy metal plate with matching contour provides the second capacitor plate. Heating of the diaphragm causes expansion and thus a change in the electrical capacity between the two plates, and this is detected by appropriate auxiliary electrical equipment.

All of these prior detectors depend on the thermal expansion resulting from the heat of the incident radiation to produce a motion which is subsequently converted to an electrical signal. In theory, these detectors have a background noise which is based on a fundamental limitation arising from the thermal agitation or "Brownian motion" of the expansible member. In practice, in the Dingee and Jones detectors, this fundamental limitation is rarely reached since a much larger source of background noise arises from acoustical and mechanical vibrations transmitted to the expansible member from the immediate surroundings of the detector. In this Golay detector, sensitivity to these "microphonics" has been considerably reduced, as a result of special construction features, discussed in Golay's original paper; as a result, microphonism is not a serious problem in practice, however, the basic construction of Golay's device is such that Brownian motion effects are greatly aggravated, by comparison with my invention. An important advantage of the present detector arises from the discovery that the sensitivity to microphonic vibrations is greatly reduced if the expansible member is constrained by its supports to an unchanging dimension, and a change in tension, rather than expansion, of the member is detected. In a particular embodiment of this principle, the detecting structure is arranged so that its change in tension results in a change in its natural frequency of vibration, and auxiliary electrical equipment is arranged to respond to this change in natural period of vibration.

It is a major object of the present invention to provide an infrared detector whose sensitivity will approach closely the natural limit imposed by the statistical fluctuations in the arrival at and re-emission of photons from the receiving elements, and which is relatively free from the sources of background noise arising within the detector itself or transmitted acoustically or mechanically from its immediate surroundings. Basically the detector comprises a foil or strip adapted to absorb the incident radiation, with first means holding the strip at its ends in tension so as to maintain it in condition for vibration at its characteristic frequency. The change in temperature of the strip due to the absorption of incident radiation causes a change in its tension, which in turn causes its natural frequency to change. To minimize the loss of heat from the strip and to eliminate damping of its vibration, it is mounted in a vacuum chamber having a window transparent to the incident radiation. Second means are provided to cause the strip to vibrate, and third means are provided to detect the vibration of the strip. Typically, the tension in the strip is made slowly adjustable by a fourth means, and is controlled to maintain a nominal operating frequency as will be seen.

In regard to the effect upon the detector of acoustical and mechanical vibrations, a pertinent expression for detector response to microphonism is the ratio of (1) the change in tension of the strip due to a specified transverse acceleration to (2) the change in tension of the strip due to a specified temperature change. The numerator of that ratio, i.e., the change in strip tension due to transverse acceleration, varies linearly with the amount of acceleration, so that the ratio vanishes with vanishingly small accelerations. Further, the ratio is found to vary inversely as the square of the tension in the strip, so that making such tension large reduces the microphonic response of the detector without correspondingly reducing the change in tension due to temperature. Accordingly, such a detector can be made much less subject to microphonic difficulties than prior detectors, as for example the Jones device.

In the usual application of infrared detectors, it is desirable for the detector to respond to rapidly changing incident radiation. For example, to discriminate against undesired thermal radiation, it is usual to interrupt the incident radiation to be measured at some low frequency such as ten cycles per second. Thus, a useful detector must be capable of responding with good efficiency to rapidly fluctuating incident radiation. A further object of this invention is to provide a detector with such low thermal capacity and rapid response as to meet this requirement.

These and other objects and advantages of the invention, as well as the details of illustrative embodiments, will be more fully understood from the following detailed description of the drawings, in which:

FIG. 4 is an enlarged vertical section taken through the foil holding means;

FIG. 5 is a block diagram showing system circuitry incoporating the invention;

Figure 1:
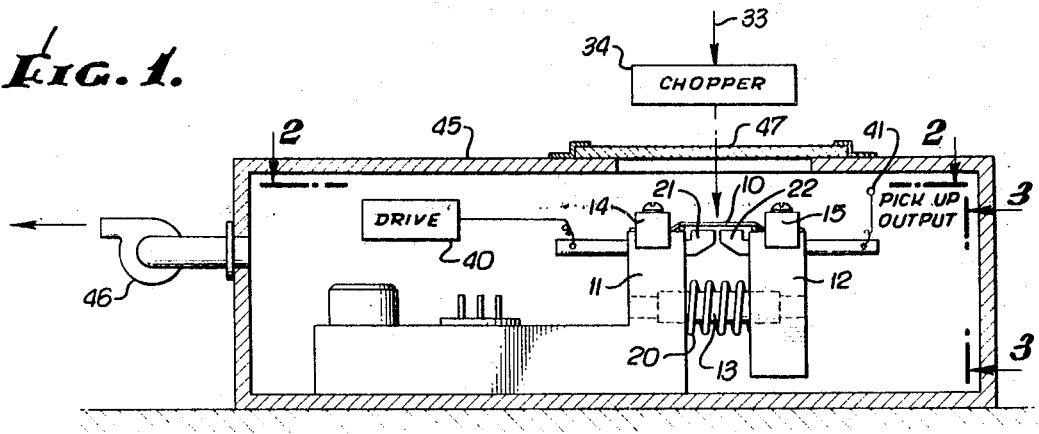
FIG. 1 is a vertical section taken in section through one form of detector apparatus embodying the invention.

In the drawings the foil 10 is shown in thin rectangular strip form, although it may have shapes other than rectangular.

The foil material should primarily have a high coefficient of thermal expansion, low thermal conductivity, low heat capacity, low density and high Young's modulus. The more favorable these properties are for a particular material, the higher the change in tension due to a change in incident radiation level, and, generally, the higher the sensitivity. Detector sensitivity should be sufficiently high that the limiting noise signal originates in the detector and not in the preamplifier.

For ultimate performance, the foil should be as thin as possible, to minimize its heat capacity and thermal conductance. If the detector is to be limited by thermal exchange noise, energy losses from the strip must occur only by radiation. The strip should be mounted in an evacuated housing to prevent convection losses; conduction losses to the support are unavoidable but can be made negligible as outlined above.

Methods for producing unsupported thin films of 0.2 micron ($2 \times 10^{-4}$ mm.) thickness or less are as follows:

(a) Vaccum deposition of material onto a polished substrate such as NaCl, which can later be separated from the film by dissolving the crystal in water;
(b) Vacuum deposition of material onto a film of collodion, which is dissolved readily in ether;
(c) Mechanical rolling of material to desired thickness;
(d) Electroplating onto electrically conductive substrate which is later dissolved away;
(e) Etching "thick" film to desired thickness.

There are some materials which have excellent properties but are exceedingly difficult to fabricate into ultrathin films. Beryllium has favorable bulk properties, but evaporated thin films are quite brittle due to a large percentage of beryllium oxide formed during the evaporation process. Nickel has favorable bulk properties, and does not readily form oxides during fabrication into thin films: and certain alloys, particularly those of nickel, are contemplated as useful for the receiver strip. It may be that all the pure metals are inappropriate for this application because of the high heat conductivity of those which are best by other criteria—except in a special case discussed below.

It is common practice to coat radiation receivers with a material of low heat capacity under evaporation conditions conducive to formation of a highly absorbing layer of low volumetric density. The result is an increase by about a factor of 20 in absorbed radiation. In the case of nickel alloy foil, nickel "black" of approximately the same amount of material per unit area as the receiver itself is evaporated onto the receiver foil in an atmosphere of argon gas, at pressures roughly in the range of 1–10 torre.

On receiver in its useable form consists of a nickel alloy foil 0.2 micron thick, coated with nickel black of the same equivalent mass as the foil—i.e., a system of about 0.4 micron total thickness.

Also contemplated is a foil thin enough to match the intrinsic impedance of free space; the result would be a foil exhibiting capacity for 25% or more absorption without blackening, resulting in a highly efficient transfer of energy to the foil. An unsupported foil of this tthickness (approximately 0.002–0.03 micron) would be very frail, but the performance of such a detector would be very close to the theoretical thermal exchange noise limit. Further, in this special case the high heat conductivity of the pure metals might be adequately offset by the low thermal-conduction cross-section of the thin strip.

In accordance with the invention, first means is provided to hold the foil in tension so as to maintain the foil in condition for vibration at characteristic frequency, which is a function of tension as well as other properties of the foil. In this regard, a change in temperature of the foil due to absorption of incident radiation causes a change in foil tension, thereby varying its characteristic or natural vibration frequency. One unusually advantageous construction of such holding means includes insulative (as for example phenolic) blocks 11 and 12 (see FIGS. 1 and 2) fastened to opposite ends of a rigid member such as aluminum rod 13, the latter having a desirable thermal coefficient of expansion and transmitting force acting to hold the foil in tension. Clamps 14 and 15, adjustably fastened at 16 and 17 to the blocks, engage the foil end portions 18 and 19, thereby to hold the foil in tension between the clamps, as best seen in FIG. 4. From the clamps, the foil typically extends over cylindrical supports 50 to turn the foil direction slightly, as shown.

The invention further contemplates the provision of means to control the temperature of the rigid rod member 13, so as to adjust the force-transmitting dimension of rod 13, thereby to control foil tension. One such temperature control means comprises a heating coil or resistance wire 20 wrapped around rod 13 as shown, so as to transfer heat to the rod causing it to expand or contract depending upon changes in heat transfer rate. Heating power for the coil 20 may be controlled in such manner that a selected nominal operating frequency of the foil is maintained, as will appear.

Foil vibration at characteristic or natural frequency is effected by means such as foil drive electrode 21, the A.C. input to which is indicated at 40. In addition, third means that may for example include pickup electrode 22 provides an output at 41 corresponding to the frequency of foil vibration. Electrode 21 is typically located to effect electrostatically induced vibration of the foil, and electrode 22 may provide capacitive pickup, so as to be sensitive to foil transverse position. As illustrated, each electrode 21 and 22 has surface area facing the foil that subtends approximately half the space beneath the foil. Other electrode positions with respect to the foil may be utilized, provided that the electrodes function to drive the foil vibrationally and sense its vibrations.

In the system illustrated, a D.C. polarizing potential must be impressed on the pickup and drive electrodes if their associated circuitry is to operate at the foil fundamental frequency. The self biasing characteristics of the FET follower 23, to be described, provide the D.C. polarizing potential as regards electrode 22. Necessary D.C. potential for drive electrode 21 is provided via D.C. source 110 and resistor 111, connected as shown in FIG. 5, a blocking capacitor 112 also being provided in path 40.

Alternatively to or in combination with the electrostatic pickup and drive systems, magnetic pickup and drive and/or optical pickup systems could be equally well employed.

A change in the radiation momentarily incident upon the foil momentarily changes foil tension and therefore its resonance frequency, the time constant of the support rod heater system being too long to permit immediate cancellation of the tension change produced by changed radiation. These changes in frequency of foil vibration are continuously monitored and made to provide an output signal proportional to the quantity of radiation instantaneously incident upon the foil.

The electrical system for sensing foil position and for keeping the foil in vibration at its own resonance frequency is schematically illustrated in FIG. 5. As there shown, the vibrating strip 10 and the stationary pickup electrode 22 form a periodically varying capacitance. The vibrating strip is grounded, and the pickup electrode is electrically connected to a field-effect transistor 23 which acts as a source follower, i.e., the variation of capacitance at the frequency of vibration of the strip induces an A.C. current in the gate of the self-biasing field-effect transistor. The A.C. current is amplified at 24 and limited at 26 to a preset level. Part of the resultant signal is fed at 40 to the drive electrode 21, the preset level being selected to produce appropriate amplitude of strip vibration. The remainder of the amplified signal is converted to an output voltage at 27 proportional to the foil vibration frequency shift caused by the change in incident radiation intensity. Such conversion is typically effected by circuit elements including amplifier 28 and discriminator 31, producing a D.C. output voltage at 27 whose amplitude varies in correspondence to the frequency shift.

Figure 2:
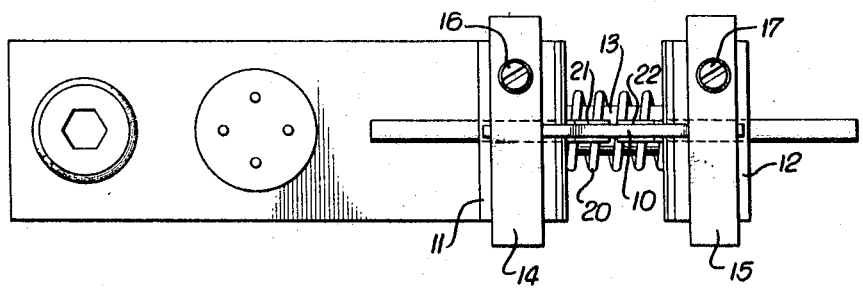
FIG. 2 is a plan view taken on line 2—2 of FIG. 1.
Figure 3:
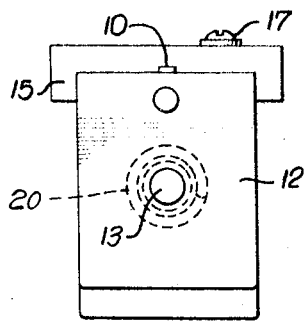
FIG. 3 is an end view taken on line 3—3 of FIG. 1.

In practice in infrared spectrophotometers, the radiant energy, indicated at 33 in FIG. 1 is periodically chopped or interrupted at 34, as for example mechanically by rotataing blades, and the signals referred to above vary periodically with chopper position. The output at 35 in FIG. 5 thus consists of an A.C. component at the chopper frequency, which is a readout signal indicative of incident radiant energy, together with a D.C. component indicative of the nominal natural frequency of the foil.

The D.C. component of the output 27 is compared at 36 with a controllable reference voltage 37, and the resultant signal at 38 controls the heater element 20, as mentioned above, to insure vibration of the foil in a frequency range selected for proper discriminator operation.

Figure 5A:
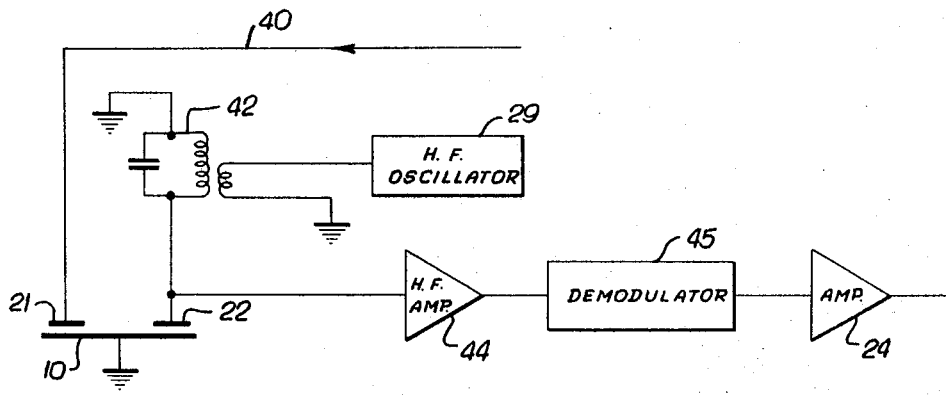
FIG. 5a is a modified version of a portion of FIG. 5.

As explained above in connection with FIG. 5, when the pickup electrode 2 is biased with a D.C. voltage, the A.C. signal delivered to FET follower 23 has the frequency of vibration of the strip. However, there is an advantage in employing a high frequency A.C. bias as illustrated in FIG. 5a. In this embodiment, electrode 22 is held at ground potential for D.C., but is biased by a radio frequency signal originating in the high frequency oscillator 29 which is loosely coupled to the high frequency resonant circuit 42. The varying capacity between electrode 22 and the strip causes the amplitude of the RF oscillation on electrode 22 to vary and this modulated high frequency signal is transmitted to high frequency amplifier 44 and to demodulator 45. The output of the demodulator has an A.C. component at the frequency of vibration of the strip which may be further amplified by amplifier 24 and processed as shown in the remainder of the circuit of FIG. 5.

Figure 5B:
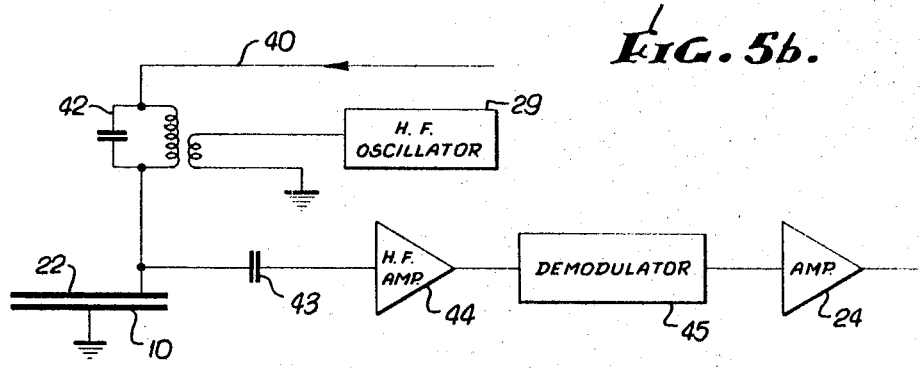
FIG. 5b is another modified version of a portion of FIG. 5.

There are several advantages to employing the high frequency bias on electrode 22 as just described. The impedance of the capacity between the electrode 22 and the strip 10 is very much lower at the frequency of the HF oscillator than at the natural frequency of vibration of the strip. This makes it easier to design the amplifier for the signal on electrode 22 so as to avoid introducing extraneous electrical noise. Furthermore, the A.C. signals at the frequency of vibration of the strip which appear on connector 40 and electrode 21 have no effect on the high frequency amplifier 44 and, thus, stray capacitances between electrodes 21 and 22 will not lead to a signal transfer between these electrodes that is independent of the vibration of the strip. Indeed, the use of the high frequency bias voltage on electrode 22 so completely isolates crosstalk between the signals on connector 40 and the signals handled by high frequency amplifier 44 that it becomes possible to combine electrodes 21 and 22, thus eliminating one of the electrodes. In this case, as illustrated in FIG. 5b, the resonant circuit 42 would not be connected to ground as shown but would be connected instead to connector 40, and the connection of 40 to electrode 21 would be eliminated. The capacitor 43 would be included in the circuit so as to transmit high frequency signals to amplifier 44 but to avoid short-circuiting these low frequency signals supplied to electrode 22 by connector 40.

Figure 5C:
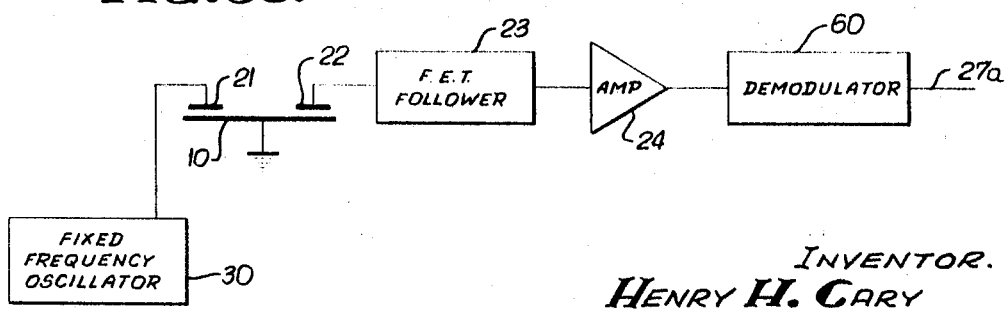
FIG. 5c is yet another modified version of a portion of FIG. 5.

In the embodiment illustrated in FIG. 5, a conventional frequency discriminator 31 may be employed, containing a frequency-discriminating element. This latter may conveniently be a Foster-Seeley circuit, in which case the frequency-discriminating element is composed of a coil and capacitor. Alternatively to the embodiment illustrated, the foil 10 (with its drive and pickup electronics) may be employed as a discriminator element, driven near resonance by a fixed-frequency oscillator: in this case, illustrated in FIG. 5c, the foil does not oscillate at its resonant frequency, but is forced to oscillate at the driving frequency of the fixed-frequency oscillator 30. The amplitude of the foil oscillations will increase or decrease as temperature changes of the foil cause its resonance frequency to move closer to or away from the frequency of the fixed-frequency oscillator. These fixed frequencies of changing amplitude may then be demodulated at 60 to provide the same sort of signals 27a as appear on the output 27 of the discriminator 31 in FIG. 5.

Yet other equivalent interpretative arrangements for my improved detector are alternatives within the scope of the present invention. For example, the foil may be vibrated at its characteristic resonant frequency, as in the embodiment initially discussed above, and its electrical output at this frequency made to beat with the output of a fixed-frequency oscillator. The beat frequency may then be monitored and made to provide an extremely sensitive function of the resonant frequency of the foil, and thus in turn of the thermal energy incident thereon.

Referring back to FIG. 1, the apparatus including the foil is shown as received within a closed chamber 45, which is at least partially evacuated, as by pump 46, in order to reduce the production of noise associated with gas contact with the foil. The chamber includes a window 47 for passing radiation incident upon the foil.

As was mentioned before, detectors constructed by Dingee and by Jones suffered from microphonism. This is particularly due to low compressive forces used in the Dingee detector and low tension in the Jones detector. The present invention utilizes rather high forces—approaching the breaking strength of the foil. These are orders of magnitude higher than the forces involved in Dingee's or Jones' design; microphonic response is accordingly reduced to a negligible level.

Further, the present detector does not rely on electrical conduction through the active elements, and is therefore free from the Johnson noise limitations of thermocouple and bolometer systems; it thus offers a 20× lower noise equivalent power.

Figure 6:
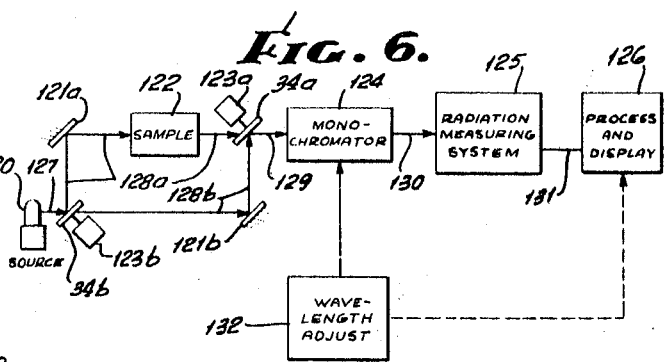
FIG. 6 is a schematic representation of a device for measuring the spectral characteristics of chemical specimens, said device incorporating the radiation measuring systems illustrated in the other figures.

Typical apparatus in which the above-described radiation measuring system is of advantageous use appears in FIG. 6. Infrared source 120 directs infrared radiation at 127 to rotating sectored mirror 34b, driven by motor 123b. The rotating mirror alternately directs the radiation along paths 128a and 128b to second rotating sectored mirror 34a driven by motor 123a. In traversing path 128a, the radiation is deflected by stationary plane mirror 121a to pass through specimen 122, whose optical absorption characteristics are to be determined. In traversing path 128b, the radiation is deflected by mirror 121b.

Rotating mirror 34a produces recombined beam 129, which consists of pulses or radiation which has passed through sample 122, alternating with pulses or radiation which has not passed through sample 122. Beam 129 enters monochromator 124, which selects a narrow waveband of the radiation in beam 129 for transmission at 130 to radiation measuring system 125. The latter may be any one of the systems illustrated in FIGS. 5 through 5c. The electrical signal from radiation measuring system 125 is directed at 131 to processing and readout means 126, which processes conventionally the alternating pulsed electrical signal 131, to obtain the ratio of the two respective pulse heights. As these pulse heights are representative of the radiation traversing paths 128a and 128b respectively, the ratio is thus representative of the ratio between the intensity of radiation leaving specimen 122 and that of radiation entering specimen 122. The ratio is displayed automatically by a recorder, panel meter, digital display device, or the like. The wavelength of radiation 130 selected by monochromator 124 is determined by adjusting means 132, which also controls processing and readout means 126 to correlate the aforementioned ratio with said wavelength. The resulting displayed information thus represents the spectral transmission characteristic of specimen 122.

In the apparatus described above, processing and readout means 126 comprises an electrical null-balance system. Other typical apparatus utilizes an optical null-balance arrangement, comprising an optical wedge or other variable attenuator (not illustrated) in the first "leg" of path 128b; in this case, processing and readout block 126 includes an electronic comparator whose output is adapted to "drive" the variable attenuator to equalize the two pulse heights in beam 129.

I claim:
1. A radiation measuring device comprising:
a foil characterized as having surface dimensions many times larger than its thickness,
means disposing said foil under tension to receive impingement of radiation to be measured, the foil having a tensioned zone presented to receive said radiation,
means spaced from the foil for inducing vibration of said foil,
means to cyclically interrupt radiation incident upon the foil,
the tensioned dimension of the foil being dynamically constrained by said disposing means to be substantially unchanging over periods of time at least as long as a few cycles of said cyclical interruption, and at least as long as many vibrations of said foil, and
means for measuring changes in said tension arising from incidence of said radiation, said measuring means functioning by measuring changes in a characteristic of said vibration.

2. The device of claim 1, wherein:
said vibration proceeds at the natural resonant frequency of said foil; and
said characteristic is said frequency.

3. The device of cailm 1, wherein said foil is composed of nickel alloy.

4. The device of claim 1, wherein:
said vibration proceeds at a substantially constant frequency near the natural resonant frequency of said foil;
said characteristic is the amplitude of said vibration; and
the tensioned length of said foil remains essentially constant.

5. Apparatus as defined in claim 4 wherein said inducing means comprises a foil drive electrode to effect application of varying electrostatic force to the foil and a source of fixed frequency oscillations electrically connected with said drive electrode.

6. The device of claim 1, wherein said inducing means functions by application of varying electrostatic force.

7. The device of claim 6, wherein:
said measuring means comprises a capacitive pickup; and
a single electrode disposed adjacent said foil serves both for the application of said force and as said capacitive pickup.

8. The device of claim 1, wherein said measuring means comprises a capacitive pickup.

9. Apparatus as defined in claim 8 in which said measuring means includes a high-frequency carrier source electrically connected with said capacitive pickup.

10. A radiation measuring device comprising
a foil;
means for disposing said foil under tension to receive radiation to be measured;
means for measuring changes in said tension arising from incidence of said radiation; and
means for inducing vibration of said foil, said measuring means functioning by measuring changes in a characteristic of said vibration, and said disposing means maintaining the time-average value of said characteristic at a pre-selected value.

11. The device of claim 10, wherein said disposing means comprises: a member subject to dimensional variation parallel to said tension; and means, responsive to said time-average value, for controlling said variation.

12. The device of claim 10, including an at least partially evacuated chamber in which said foil is received, the chamber having a window located to pass infrared radiation for incidence upon the foil.

13. The device of claim 10, including means to cyclically interrupt radiation incident upon the foil.

14. In apparatus for measuring the spectral characteristics of specimens, comprising a source of radiation, means for periodically interrupting a beam of radiation emanating from said source, means for disposing a specimen for passage therethrough of said beam, an adjustable monochromator selecting from said beam a narrow waveband of radiation from said source, and utilization means for deriving and displaying the spectral characteristics of said specimen, the improvement comprising:

a relatively broad and thin elongated foil disposed under tension and having a zone to receive incidence of said beam after passage through said specimen;

means for inducing vibration of the foil, the elongation of said foil being dynamically maintained substantially constant over time intervals comparable with a plurality of cycles of said interruption and with a multiplicity of vibrations of said foil, means responsive to a fluctuating parameter of said vibration for measuring changes in said tension arising from incidence of said radiation beam;

said measuring means producing an electrical signal for processing and display by said utilization means.

References Cited

UNITED STATES PATENTS

| 2,456,811 | 12/1948 | Blackburn. | |
|---|---|---|---|
| 2,463,312 | 3/1949 | Rieber | 324—106 |
| 3,183,764 | 5/1965 | Sundstrom. | |
| 3,254,222 | 5/1966 | Hudson | 73—355 |
| 3,318,152 | 5/1967 | Thompson et al. | |

WILLIAM F. LINDQUIST, Primary Examiner

MORTON J. FROME, Assistant Examiner

U.S. Cl. X.R.

73—339, 355, 362, 398